United States Patent
Divisi

(10) Patent No.: US 8,257,065 B2
(45) Date of Patent: Sep. 4, 2012

(54) HIGH PRESSURE LUBRICANT PUMP FOR STEELWORKS

(75) Inventor: Walter Divisi, Egham Surrey (GB)

(73) Assignee: DROPSA S.p.A., Milan (IT)

( * ) Notice: Subject to any disclaimer, the term of this patent is extended or adjusted under 35 U.S.C. 154(b) by 1028 days.

(21) Appl. No.: 11/871,041

(22) Filed: Oct. 11, 2007

(65) Prior Publication Data
US 2008/0095650 A1    Apr. 24, 2008

(30) Foreign Application Priority Data
Oct. 18, 2006   (IT) .................. MI06A2003

(51) Int. Cl.
*F04B 19/22*    (2006.01)
*F04B 39/10*    (2006.01)
*F01B 29/08*    (2006.01)
*F16K 15/04*    (2006.01)

(52) U.S. Cl. ......... 417/470; 417/501; 92/128; 92/171.1; 137/539

(58) Field of Classification Search ........... 417/470, 417/490, 501; 92/128, 130 C, 171.1; 137/539
See application file for complete search history.

(56) References Cited

U.S. PATENT DOCUMENTS

| | | | | |
|---|---|---|---|---|
| 2,557,880 A * | 6/1951 | Lynn | ............................. | 222/380 |
| 2,693,150 A * | 11/1954 | Pickard et al. | ................ | 417/273 |
| 4,587,912 A * | 5/1986 | Wolff et al. | ................... | 112/256 |
| 5,848,879 A | 12/1998 | Hansson | ....................... | 417/521 |
| 6,764,286 B2 * | 7/2004 | Hunnicutt et al. | ........... | 417/470 |
| 2002/0102170 A1* | 8/2002 | Reuter et al. | ................. | 417/470 |
| 2004/0091377 A1* | 5/2004 | Uryu et al. | .................... | 417/470 |
| 2009/0162216 A1 | 6/2009 | Paluncic | | |

FOREIGN PATENT DOCUMENTS

| | | |
|---|---|---|
| CN | 2460846 Y | 11/2001 |
| DE | 29708581 U1 | 7/1997 |
| DE | 29708582 U1 | 7/1997 |
| DE | 202005018630 U1 | 3/2006 |
| EP | 1112820 A2 | 7/2001 |
| JP | 10318127 A | 2/1998 |
| JP | 10325394 A | 8/1998 |
| WO | WO 9700716 A1 | 1/1997 |

OTHER PUBLICATIONS

EPO Extended Search Report for related application EPO7118396.6.

* cited by examiner

*Primary Examiner* — Charles Freay
(74) *Attorney, Agent, or Firm* — Ladas & Parry, LLP

(57) ABSTRACT

The high pressure lubricant pump for steelworks has a body provided with at least one cylinder, the cylinder having a lubricant intake port and a lubricant delivery port. Within the cylinder a piston is movable to pressurize the lubricant. The cylinder and the piston define a pre-assembled pumping unit removably fixed into a seat of the body.

20 Claims, 5 Drawing Sheets

HIGH PRESSURE LUBRICANT PUMP FOR STEELWORKS

FIELD OF THE INVENTION

The present invention relates to a high pressure lubricant pump for steelworks.

BACKGROUND OF THE INVENTION

In steelworks it is known to use pumps for feeding lubricant (in the form of oil or grease) at a high pressure which can reach very high values, up to 450/500 atmospheres.

DISCUSSION OF THE RELATED ART

These pumps are usually in the form of a body defining one or usually more cylinders within which pistons are movable, each against a spring.

The pistons are operated by cranks or cams (because of the high pressures and hence stresses in play).

Because of the high stresses in play (caused by the very high pressures) the pump mechanical components can undergo breakage and have to be repaired or replaced.

For example, those components subject to breakage are the piston, the springs and gaskets, the actual cylinder itself being subject to very intense wear.

However, the described traditional pump structure is very complex, resulting in considerable times for dismantling and reassembling the pump for ordinary or extraordinary maintenance.

For example, replacing just one of the aforesaid damaged components means that the pump has to be dismantled, involving an intervention time (making it impossible to use the pump and possibly its entire associated plant) of at least 3-4 hours.

In addition, prior to and during operation the lubricant has to be heated to bring it to its operating temperature.

The heating operation is extremely important, particularly when the lubricant is grease because low temperature grease (even at ambient temperature) is not easily pumpable and certain types of grease even behave as a solid; it is therefore apparent that if an attempt is made to pump low temperature grease, there is a risk of seriously damaging the pump mechanical components.

Consequently pumps of the stated type are always provided with means for heating the lubricant being pumped.

In this respect, the present pumps are provided with cylindrical vessels which extend vertically above the pumps.

The overall surfaces of the cylindrical vessels are used for heating the lubricant; this is done by applying bands carrying heating electrical resistance elements to the outside of the vessels.

Hence before and during pumping, said bands are applied so that the electrical resistance elements heat the lubricant contained in the vessel and bring it to the required working temperature.

However this heating method presents certain drawbacks, in particular in the high cost of the heating bands and the difficulty of applying them to the vessels (in this respect, the vessels usually have a diameter of about 60 centimeters and a height of 1 meter or more).

In addition, using such bands to heat the lubricant means that the lubricant contained in the vessel and particularly in those vessel portions against which the bands are applied become heated to a greater extent.

In moving away from these band application regions the heating effect decreases, and in regions very distant therefrom such as within the pump interior, there is a risk that the lubricant is not sufficiently heated; this can especially be the case for lubricants with very poor heat transfer.

SUMMARY OF THE INVENTION

The technical aim of the present invention is therefore to provide a high pressure lubricant pump for steelworks by which the stated technical drawbacks of the known art are eliminated.

Within the scope of this technical aim, an object of the invention is to provide a pump on which very rapid maintenance can be carried out.

Another object of the invention is to provide a structurally simple pump.

A further object of the invention is to provide a pump in which the lubricant heating elements are economical and easily applicable to the pump.

Another object of the invention is to provide a pump in which heating of the lubricant contained within the pump body is always ensured for any heating condition and for any lubricant type, independently of its thermal conductivity.

The technical aim, together with these and further objects, are attained according to the present invention by providing a high pressure lubricant pump for steelworks in accordance with the enclosed claims.

Other characteristics of the present invention are defined in the subsequent claims.

Advantageously, the pump heating system according to the invention enables considerable energy saving as heat transfer is concentrated within that pump region in which the highest lubricant temperature is required, without having to intensely heat the entire lubricant mass contained in the cylindrical vessel.

BRIEF DESCRIPTION OF THE DRAWINGS

Further characteristics and advantages of the invention will be more apparent from the description of a preferred but non-exclusive embodiment of the pump of the invention, illustrated by way of non-limiting example in the accompanying drawings, in which.

DETAILED DESCRIPTION OF THE INVENTION

Figure 1:
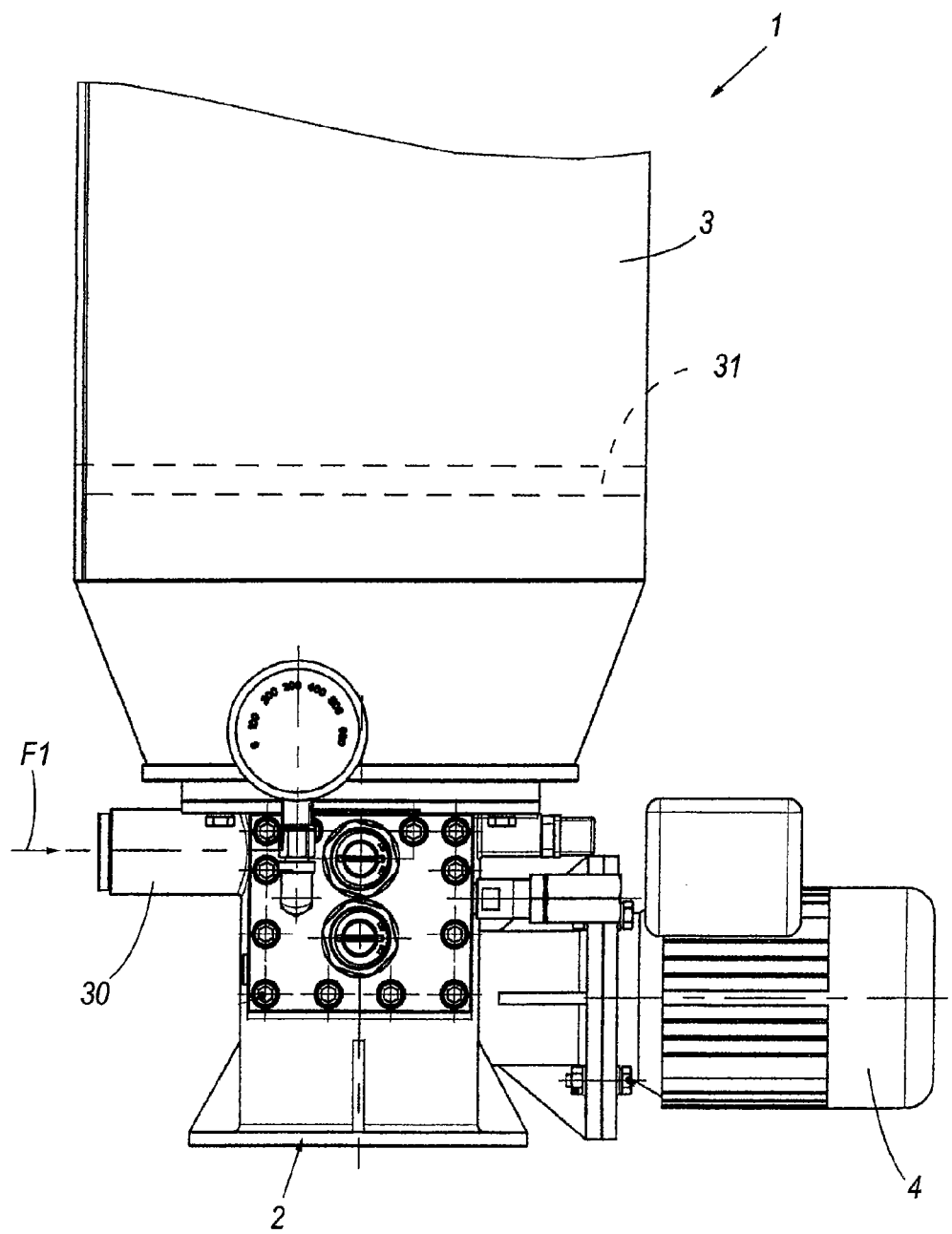
FIG. 1 is a front elevation view of a pump according to the invention.
Figure 2:
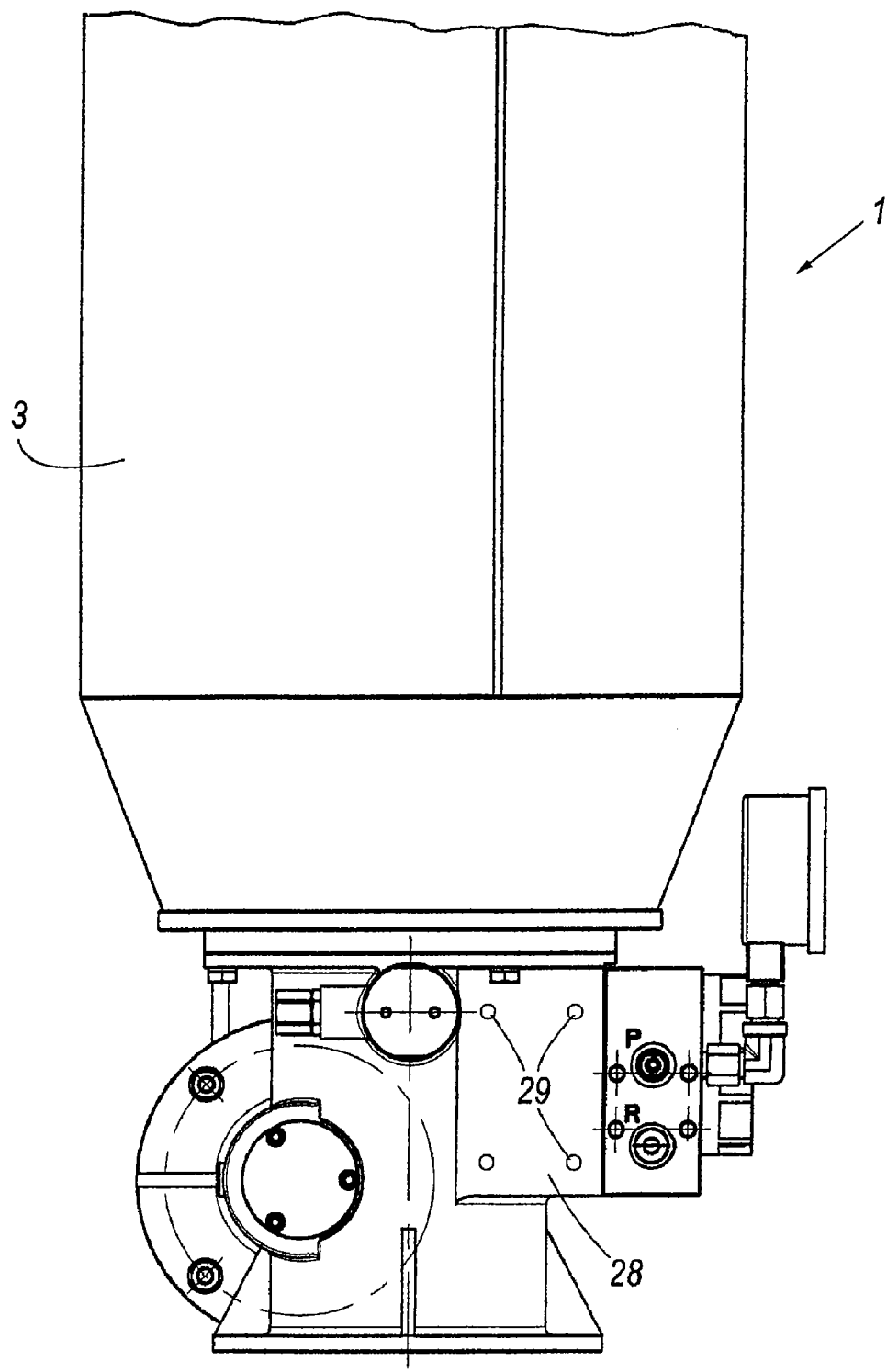
FIG. 2 is a side elevation view of the pump of FIG. 1.

With reference to said figures, these show a high pressure lubricant pump for steelworks indicated overall by the reference numeral 1.

The pump 1 comprises generically a body 2 connected to a cylindrical vessel 3 and provided with a drive motor 4.

The body 2 is provided with two cylinders 5 for lubricant pumping, however in other embodiments the number of cylinders can be different, with the body presenting a single cylinder or more than two cylinders.

Each of the cylinders 5 is provided with lubricant intake ports 7 and a lubricant delivery port 8, for entry of the lubricant to be pumped and for exit of the pressurized lubricant.

In addition, a piston 10 is movable with reciprocating translatory movement (to-and-fro movement) within each cylinder 5 to pressurize the lubricant.

Figure 3:
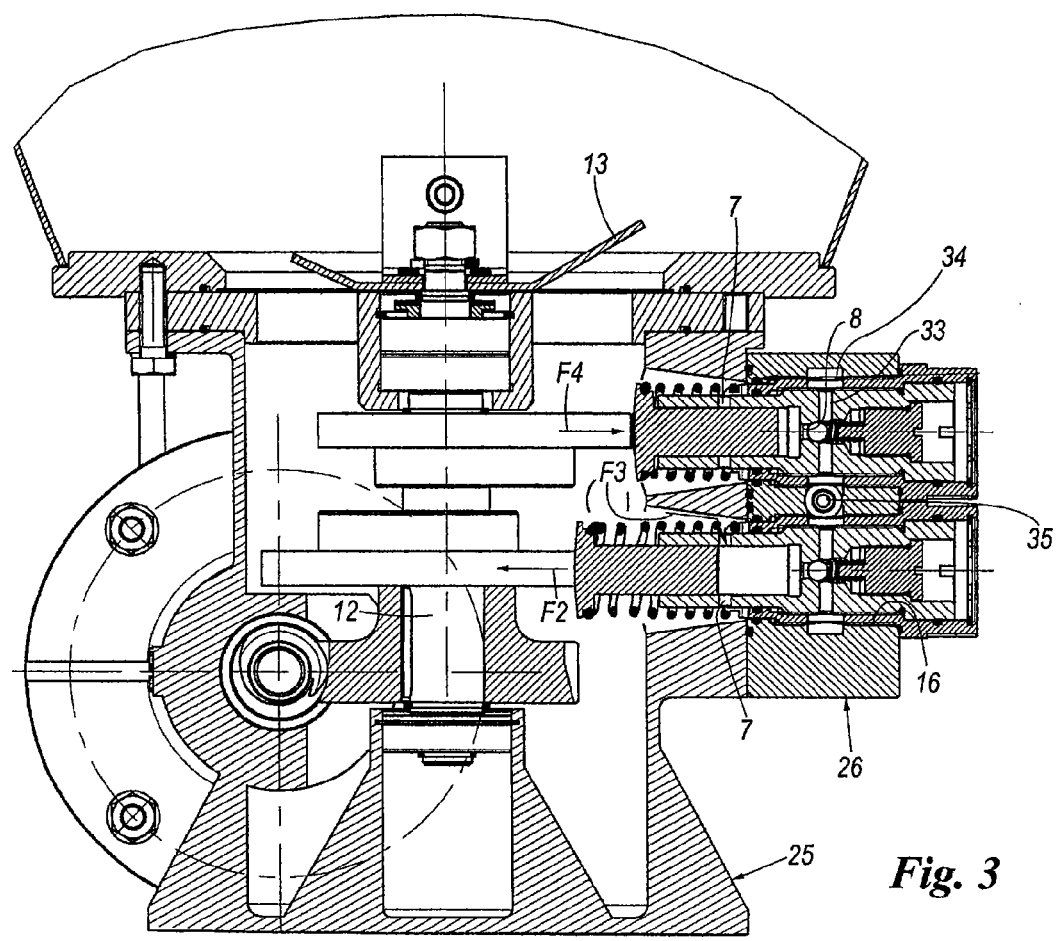
FIG. 3 is an enlarged section through the pump of FIG. 2.
Figure 4:
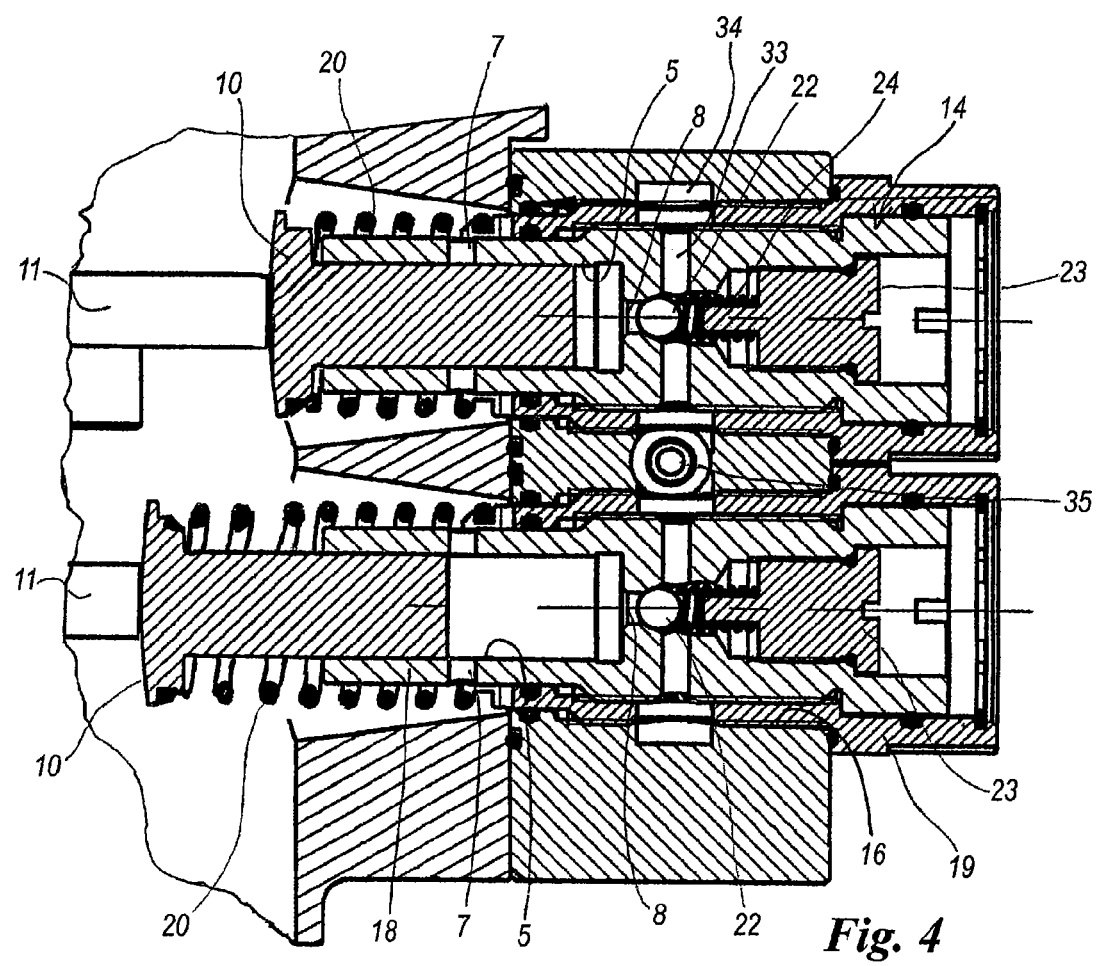
FIG. 4 is an enlarged portion of FIG. 3.
Figure 5:
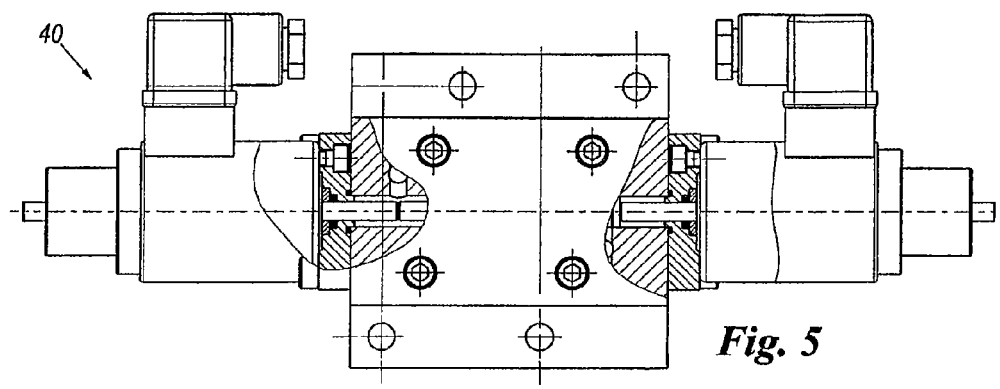
FIGS. 5 and 6 show a flow inverter applied to the pump of the invention.
Figure 6:
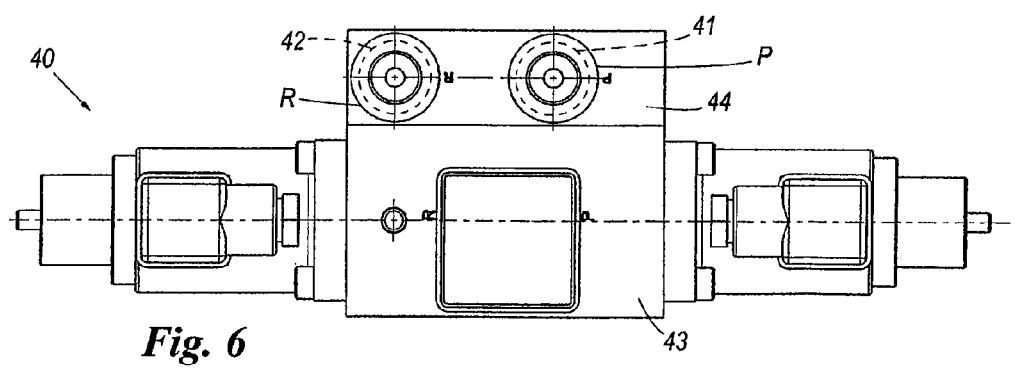

Each piston 10 has an end, external to the cylinder 5, associated with a cam 11; as shown in particular in FIG. 3, all the cams 11 are carried by a drive shaft 12 driven in rotation by the motor 4. The drive shaft 12 also drives a mixer 13 for agitating the lubricant.

Advantageously, each cylinder 5 and each corresponding piston 10 (i.e. each piston inserted therein) define a pre-assembled pumping unit 14 removably fixed into a seat 16 of the body 2.

In practice, the pumping unit 14 can be assembled separately from the pump body 2 and then be fixed into the seat 16, which is preferably threaded.

The pumping unit 14 comprises a tubular element 18 of steel construction which defines the cylinder 5 and is provided with a stop for the piston 10, to prevent the piston 10 from escaping from the cylinder 5.

On the outside of the tubular element 18 between the tubular element 18 and the piston 10, a spring 20 is interposed against which the piston 10 is driven; in other words the cam 11 inserts the piston 10 into the cylinder 5 while the spring 20 causes it to emerge, to maintain the piston 10 in sliding contact with the cam 11.

The tubular element 18 is contained in a second tubular element 19 which locks the spring 20 at one of its ends; at its other end the spring 20 is locked onto the piston 10 to define said stop to prevent the piston escaping from the cylinder 5.

The pumping unit 14 comprises a unidirectional valve 22 of ball type, positioned at the delivery port 8, to enable lubricant to only leave the cylinder 5.

The unidirectional valve 22 is suitably provided with pre-setting means to regulate the operating pressure within the cylinder at which it opens to deliver lubricant.

The presetting means consist of a base 23 screwed into a seat in the tubular element 18 and acting as a counteracting member for a spring 24 of the unidirectional valve 22.

In a preferred embodiment, the body 2 is defined by a first and second element 25, 26 removably joined together for example by screws (not shown).

The second element 26 comprises the seats 16 for housing the pumping units 14, the first element 25 at least partially defining the vessel for containing the lubricant to be pumped.

The first element 25 is suitably of cast aluminium, while the second element 26 can be of steel or also of aluminium.

The pump presents lubricant heating means associated with the first and/or second element 25, 26 of the body 2.

These heating means comprise a continuous flat wall 28 of the first element 25 of the body 2 and arranged to support a heater (not shown), to transmit the heat provided by the heater.

Specifically, this wall 28 presents heater coupling members consisting of threaded seats 29 into which heater fixing screws are screwed.

The heater can be of any type but is preferably of the electrical resistance element type.

In addition the body 2 (preferably its first constituent element 25) defines a seat 30 for receiving a filter for the lubricant entering the body 2.

The operation of the pump of the invention is apparent from that described and illustrated, and is substantially as follows.

The lubricant enters the body 2 through the filter 30 as illustrated by the arrow F1.

The lubricant is fed into the body 2 from below because the vessel 3 is provided with a slidable cover 31 which prevents air entry into its interior and exerts a preset pressure on the lubricant.

During operation the lubricant is present in the interior of the body 2 and hence lubricates all the mechanical components such as the drive motor 12, the cams 11, etc.

As the drive motor 12 rotates it operates the cams 11 which then drive the pistons 10 with reciprocating translation, these being sealedly slidable within the cylinders 5, hence when they emerge from the cylinders (by moving as indicated by the arrow F2) they put the interior of the corresponding cylinder 5 under vacuum.

When the port 7 opens, the vacuum acting inside the corresponding cylinder 5 draws in the lubricant to fill the cylinder 5 as indicated by the arrow F3.

The piston 10 then reverses its movement and translates as indicated by the arrow F4 to close the port 7 and compress the lubricant within the cylinder 5.

The lubricant pressure in the cylinder 5 rises until it reaches and exceeds the preset value of the unidirectional valve 22, causing it to open.

At this point the lubricant passes through the port 8 and flows into a delivery conduit presenting radial branches 33 which open into an annular branch 34 connected to an externally directed connector 35.

Maintenance can be carried out easily and rapidly.

In this respect, if a component of a pumping unit 14 is damaged, the corresponding pre-assembled pumping unit is removed by unscrewing the tubular element 19 carrying the element 18 which itself carries the piston 10 locked to it (by the spring 20).

Hence by unscrewing the tubular element 19, the entire pumping unit 14 can be removed.

The subsequent maintenance operations or the replacement of one or more components can then be carried out easily and quickly; in addition, the entire damaged pumping unit can be replaced by simply screwing a different (operational) pumping unit into the seat 16 from which the damaged pumping unit has been removed.

Modifications and variants in addition to those already described are possible, for example the pump can be provided with a lubricant flow inverter 40 applied at the delivery.

Specifically, the inverter 40 is provided with a first and second inlet 41, 42 and two outlets (for the external pipes) identified by the letters P and R, it having its first inlet 41 aligned with the outlet P and its second inlet 42 aligned with the outlet R.

The inverter 40 is arranged to assume a first configuration in which the first inlet 41 is connected to the first outlet P and the second inlet 42 to the second outlet R, and a second configuration in which the first inlet 41 is connected to the second outlet R and the second inlet 42 is connected to the first outlet P.

The inverter 40 is formed as two elements, a first element 43 carrying the functional part of the inverter (of traditional type), and the second element 44 carrying only the connectors.

The two elements 43, 44 are removably connected together such that if damage or problems occur in the inverter functional components, the first element can be separated from the second element without the need to also separate the plant pipework from the second element, after which the first element can be replaced (with all the functional components which it carries).

This connection is made for example by screws.

It has been found in practice that the high pressure lubricant pump for steelworks according to the invention is particularly advantageous as it enables maintenance operations to be carried out easily and rapidly, while also enabling the functional part of an inverter (if present) to be replaced in a likewise easy and rapid manner, without having to separate the plant pipework from the pump.

The high pressure lubricant pump for steelworks conceiver in this manner is susceptible to numerous modifications and variants, all falling within the scope of the inventive concept; moreover all details can be replaced by technically equivalent elements.

In practice the materials used and the dimensions can be chosen at will in accordance with requirements and with the state of the art.

What I claim is:

1. A high pressure lubricant pump for steelworks comprising:
    a body having a seat for removably receiving a pumping unit;
    the pumping unit comprising:
        a cylinder provided with at least one lubricant intake port and at least one lubricant delivery port, and formed in a first tubular element;
        a piston being movable within said cylinder to pressurize said lubricant; and
        a spring interposed between said first tubular element and said piston on the outside of the tubular element, the first tubular element being contained in a second tubular element which locks the spring at one of the ends of the spring, the other end of the spring being locked onto the piston to define a stop to prevent the piston exiting from the cylinder
    wherein the pumping unit is configured to be removable and replaceable as a single unit.

2. A pump as claimed in claim 1, wherein said first tubular element is provided with said stop for said piston, to prevent said piston exiting from said cylinder.

3. A pump as claimed in claim 1, wherein said pumping unit comprises a unidirectional valve positioned at said delivery port, said unidirectional valve enabling lubricant to only leave said cylinder.

4. A pump as claimed in claim 3, wherein said unidirectional valve comprises presetting means arranged for modifying the pressure within the cylinder at which the unidirectional valve opens.

5. A pump as claimed in claim 1, wherein said first tubular element is of steel construction.

6. A pump as claimed in claim 1, wherein said body is defined by a first and a second element removably fixed together, said second element comprising said seat for housing said pumping unit.

7. A pump as claimed in claim 6, wherein said first element at least partially defines a vessel for containing the lubricant to be pumped.

8. A pump as claimed in claim 6, wherein at least said first element is made of cast aluminium.

9. A pump as claimed in claim 6, further comprising lubricant heating means associated with said first and/or second element of said body.

10. A pump as claimed in claim 9, wherein said heating means comprise, of said first element of said body, a continuous wall arranged to support a heater and to transmit the heat produced by said heater.

11. A pump as claimed in claim 10, wherein said continuous wall is flat.

12. A pump as claimed in claim 10, wherein said heater is of electrical resistance element type.

13. A pump as claimed in claim 1, wherein said body defines a seat for receiving a filter for the lubricant entering said body.

14. A pump as claimed in claim 1 further comprising lubricant heating means associated with said body.

15. A pump as claimed in claim 14, wherein said body comprises a continuous wall, and wherein said heating means comprise said continuous wall, said continuous wall being arranged to support a heater and to transmit the heat produced by said heater.

16. A pump as claimed in claim 15, wherein said continuous wall is flat.

17. The pump of claim 1, wherein said piston is attached to said cylinder in said pumping unit.

18. The pump as claimed in claim 1, wherein the seat is threaded.

19. The pump as claimed in claim 1, wherein the pumping unit is removable by unscrewing the tubular element from the seat.

20. A high pressure lubricant pump for steelworks comprising:
    a body having a seat for removably receiving a pumping unit; and
    a cam, the pumping unit comprising:
        a cylinder provided with at least one lubricant intake port and at least one lubricant delivery port, and formed in a first tubular element;
        a piston being movable by said cam within said cylinder to pressurize said lubricant; and
        a spring associated with said cam and said piston to maintain said piston in contact with said cam, said spring interposed between said first tubular element and said piston on the outside of the first tubular element, the first tubular element being contained in a second tubular element which locks the spring at one of the ends of the spring, the other end of the spring being locked onto the piston to define a stop to prevent the piston exiting from the cylinder,
    wherein the pumping unit is configured to be removable and replaceable as a single unit.

* * * * *